US010205660B2

(12) United States Patent
Cox et al.

(10) Patent No.: US 10,205,660 B2
(45) Date of Patent: Feb. 12, 2019

(54) APPARATUS AND METHOD FOR PACKET HEADER COMPRESSION

(71) Applicant: Avago Technologies International Sales Pte. Limited, Singapore (SG)

(72) Inventors: Ian Bruce Bernard Cox, Fremont, CA (US); Ariel Hendel, Cupertino, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 88 days.

(21) Appl. No.: 15/172,835

(22) Filed: Jun. 3, 2016

(65) Prior Publication Data

US 2016/0359739 A1    Dec. 8, 2016

Related U.S. Application Data

(60) Provisional application No. 62/170,525, filed on Jun. 3, 2015.

(51) Int. Cl.
*H04L 12/741* (2013.01)
*H04L 29/06* (2006.01)
*H04L 29/08* (2006.01)
*H04L 12/721* (2013.01)

(52) U.S. Cl.
CPC .............. *H04L 45/74* (2013.01); *H04L 69/22* (2013.01); *H04L 69/324* (2013.01); *H04L 69/325* (2013.01); *H04L 45/66* (2013.01); *H04L 2212/00* (2013.01)

(58) Field of Classification Search
None
See application file for complete search history.

(56) References Cited

U.S. PATENT DOCUMENTS

| 2008/0101220 | A1* | 5/2008 | Kim | H04L 12/189 |
| | | | | 370/229 |
| 2011/0128975 | A1* | 6/2011 | Kang | H04L 65/605 |
| | | | | 370/477 |
| 2013/0077557 | A1* | 3/2013 | Chen | H04B 7/15 |
| | | | | 370/315 |
| 2013/0107895 | A1* | 5/2013 | Wentink | H04L 69/04 |
| | | | | 370/477 |

(Continued)

*Primary Examiner* — Christine T Duong
(74) *Attorney, Agent, or Firm* — Sterne, Kessler, Goldstein & Fox P.L.L.C.

(57) ABSTRACT

The present disclosure describes a networking switch of a network and method for operating the networking switch. The networking switch communicates within the network using datagrams, such as packets and/or frames. The frames include packets of a first communication protocol or layer having headers of the first communication protocol or layer. In some situations, the packets of the first communication protocol or layer are embedded with packets of a second communication protocol or layer. Often times, one or more fields of headers of the first communication protocol or layer convey substantially similar or redundant information, such as routing information to provide an example, as one or more fields of headers of the second communication protocol or layer. In these situations, the networking switch can compress the one or more fields of the headers of the first communication protocol or layer

22 Claims, 8 Drawing Sheets

(56) References Cited

U.S. PATENT DOCUMENTS

2015/0003247 A1* 1/2015 Mejia ................. H04L 47/12
   370/235
2018/0124638 A1* 5/2018 Del Carpio Vega .....................
   H04W 28/06

* cited by examiner

APPARATUS AND METHOD FOR PACKET HEADER COMPRESSION

CROSS-REFERENCE TO RELATED APPLICATIONS

The present application claims the benefit of U.S. Provisional Patent Appl. No. 62/170,525, filed Jun. 3, 2015, which is incorporated herein by reference in its entirety.

BACKGROUND

Field of Disclosure

The present disclosure relates generally to networking architecture, and including a networking switch in the networking architecture.

Related Art

Cloud computing provides shared processing resources and data to computers and other devices. It enables access to a shared pool of configurable computing resources, such as networks, servers, storage, applications and services to provide some examples, which can be rapidly provisioned and released with minimal management effort. Cloud computing and storage solutions provide various capabilities to remotely store and process data. These solutions rely on sharing of the configurable computing resources to achieve coherence and economy of scale. The present availability of high-capacity networks, low-cost computers and storage devices as well as the widespread adoption of hardware virtualization, service-oriented architecture, and autonomic and utility computing have led to a growth in cloud computing.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 1:
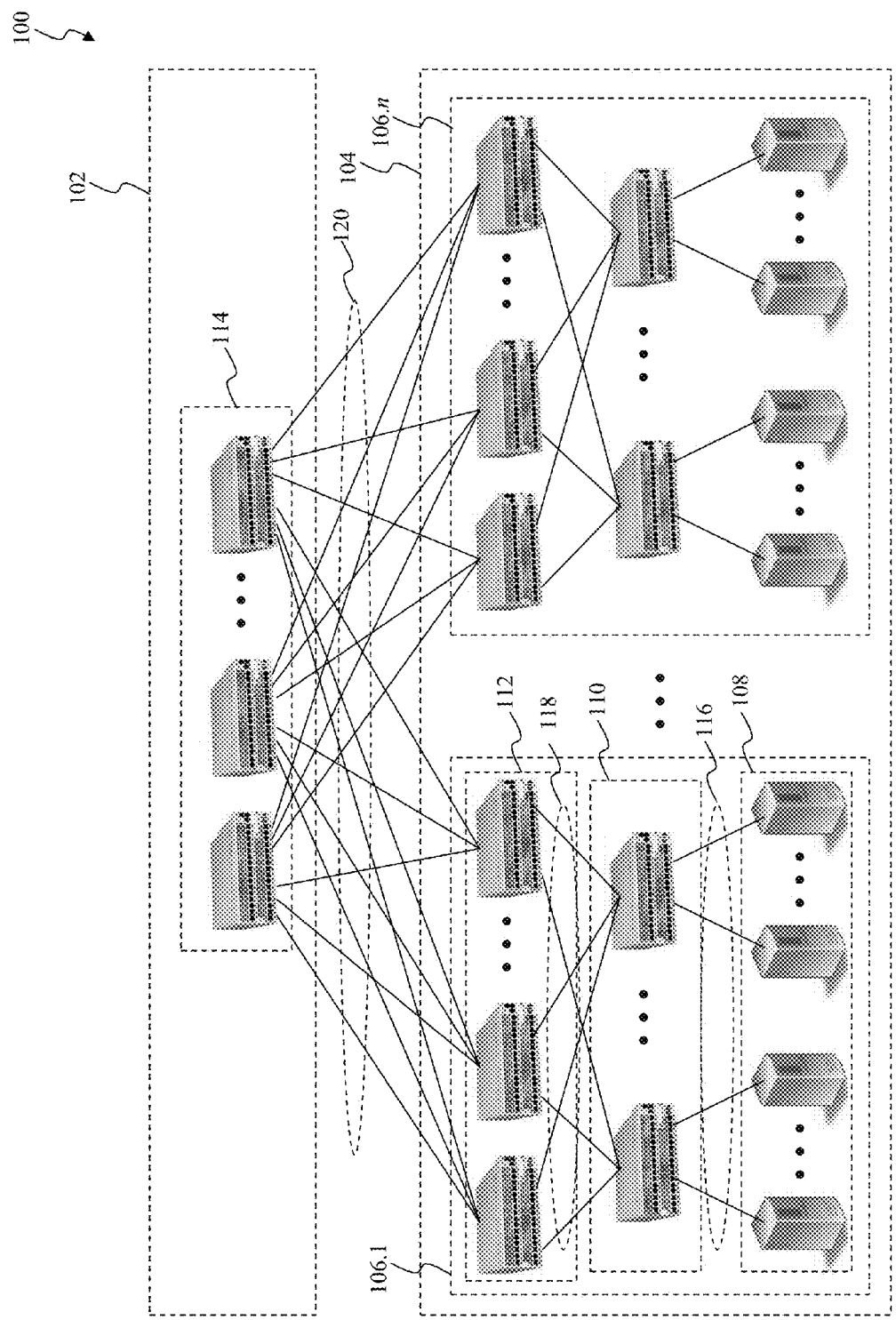
FIG. 1 illustrates an exemplary network according to an exemplary embodiment of the present disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

Overview

The present disclosure describes a networking switch of a network and method for operating the networking switch. The networking switch communicates within the network using datagrams, such as packets and/or frames. The frames include packets of a first communication protocol or layer having headers of the first communication protocol or layer. In some situations, the packets of the first communication protocol or layer are embedded with packets of a second communication protocol or layer. Often times, one or more fields of headers of the first communication protocol or layer convey substantially similar or redundant information, such as routing information to provide an example, as one or more fields of headers of the second communication protocol or layer. In these situations, the networking switch can compress the one or more fields of the headers of the first communication protocol or layer. In general, compression represents an encoding to decrease a number of bits of one or more fields of a packet and/or a frame. This encoding can include removing the one or more fields of the packet and/or the frame in their entirety, including removing a source address field and/or destination address field. Similarly, decompression represents a decoding to increase the number of bits of one or more fields of a packet and/or a frame. The decoding can include adding one or more fields to the packet and/or the frame, including adding a source address field or a destination address field that was removed during compression.

Exemplary Network

FIG. 1 illustrates an exemplary network according to an exemplary embodiment of the present disclosure. A network 100 interconnects a pool of resources, such as computational resources, storage resources, and/or edge network resources to provide some examples, that are interconnected using a communication network. As illustrated in FIG. 1, the network 100 includes a core network layer 102 and a pod network layer 104. This configuration and arrangement of the network 100 can also be referred topologically to as a leaf and spine networking architecture. Although not illustrated in FIG. 1, the core network layer 102 and/or the pod network layer 104 can access one or more local area networks (LANs), one or more wide area networks (WANs), and/or any network that will be apparent to those skilled in the relevant art(s) without departing from the spirit and scope of the present disclosure. In an exemplary embodiment, these networks can provide the network 100 access to the Internet.

The pod network layer 104, also referred to a leaf or edge network layer in the leaf-and-spine networking architecture, includes the pool of resources such as the computational resources, the storage resources, and/or the edge network resources, that are interconnected using the core network layer 102. In the exemplary embodiment illustrated in FIG. 1, the pod network layer 104 includes pods 106.1 through 106.*n* which are interconnected using the core network layer 102. In an exemplary embodiment, one or more of the pods 106.1 through 106.*n* can be located in a data center along with other components, such as redundant or backup power supplies, redundant data communications connections, environmental controls, and/or various security devices to provide some examples. In this exemplary embodiment, the data center can occupy one room of a building, one or more floors of the building, or the entire building. In some situations, components of the pods 106.1 through 106.*n*, which are to be discussed in further detail below, are mounted in rack cabinets which are usually placed in single rows forming corridors between them. The pods 106.1 through 106.*n* are implemented in a substantially similar manner to each other; therefore, the pod 106.1 is to be discussed in further detail below.

As illustrated in FIG. 1, the pod 106A is configured and arranged to be a second leaf and spine networking architecture. However, those skilled in the relevant art(s) will recognize that one or more of the pods 106.1 through 106.*n* can be configured and arranged differently, such as having a single access networking architecture to provide an example, without departing from the spirit and scope of the present disclosure. In the second leaf and spine networking architecture, the pod 106.1 includes endpoint resources 108, networking switch systems 110, and network switches 112.

As additionally illustrated in FIG. 1, the endpoint resources 108 include the computational resources, such as one or more servers as illustrated in FIG. 1, which host one or more computer systems that store data, execute one or more applications, and/or provide one or more services to other computing devices, such as mobile devices, desktop devices, laptop devices, set-top boxes, and/or other servers to provide some examples. Although not illustrated in FIG. 1, those skilled in the relevant art(s) will recognize that the endpoint resources 108 can also include the storage resources and/or the edge network resources without departing from the spirit and scope of the present disclosure.

As further illustrated in FIG. 1, the networking switch systems 110 include one or more semiconductor networking switches to provide a switching interface between the endpoint resources 108 and the networking switch systems 112. The networking switch systems 110 can be referred to as a leaf network layer of the second leaf and spine networking architecture of the pod network layer 104. In the exemplary embodiment illustrated in FIG. 1, the one or more semiconductor networking switches of the networking switch systems 110 are communicatively coupled to the one or more servers of the endpoint resources 108 via one or more wired communication links 116. In an exemplary embodiment, the one or more wired communication links 116 can include one or more copper or optical duplex links. The networking switch systems 112 include one or more semiconductor networking switches to provide a switching interface between the networking switch systems 110 and the core network layer 102. In the exemplary embodiment illustrated in FIG. 1, the one or more semiconductor networking switches of the networking switch systems 112 are communicatively coupled to the one or more semiconductor networking switches of the networking switch systems 110 via one or more wired communication links 118. In an exemplary embodiment, the one or more wired communication links 118 can include one or more copper or optical duplex links. The networking switch systems 110 can be referred to as a spine network layer of the second leaf and spine networking architecture of the pod network layer 104.

The core network layer 102, also referred to a spine network layer of the leaf-and-spine networking architecture, includes interconnections for sharing the pool of resources such as the computational resources, the storage resources, and/or the edge network resources. The core network layer 102 includes networking switches 114. In the exemplary embodiment illustrated in FIG. 1, one or more semiconductor networking switches of the core network layer 114 are communicatively coupled to the one or more semiconductor networking switches of each of the networking switch systems 112 of each of the pods 106.1 through 106.*n* via one or more wired communication links 120. In an exemplary embodiment, the one or more wired communication inks 120 can include one or more copper or optical duplex links. Although the networking switch systems 110, the networking switch systems 112, and the networking switches 114 have been described as being switches, those skilled in the relevant art(s) will recognize that the networking switch systems 110, the networking switch systems 112, and/or the and the networking switches 114 can be implemented using networking routers without departing from the spirit and score of the present disclosure.

Communication Within the Exemplary Network

The endpoint resources 108, the networking switch systems 110, the network switches 112 of the pods 106.1 through 106.*n* and/or the networking switches 114 communicate amongst themselves using datagrams, such as packets and/or frames, that are formatted in accordance with the second communication protocol or layer such as, for example, a Layer 3 communication protocol, such as Internet Protocol version 4 (IPv4) or Internet Protocol version 6 (IPv6) to provide some examples. For example, the pods 106.1 through 106.*n* can retrieve and/or generate packets of the second communication protocol or layer having headers of the second communication protocol or layer and payloads of data. Next, the endpoint resources 108, the networking switch systems 110, the network switches 112 of the pods 106.1 through 106.*n* and/or the networking switches 114 generate and append headers of the first communication protocol or layer to the packets of the second communication protocol or layer to generate packets of the first communication protocol or layer, such as, for example, a Layer 2 communication protocol, such as Ethernet to provide an example. In some situations, as to be discussed in further detail below, one or more fields of the headers of the first communication protocol or layer convey substantially similar or redundant information, such as routing information to provide an example, as one or more fields of the headers of the second communication protocol or layer. In these situations, the endpoint resources 108, the networking switch systems 110, the network switches 112 of the pods 106.1 through 106.*n* and/or the networking switches 114 can compress the one or more fields of the headers of the first communication protocol or layer. However, in some instances, one of more the one or more servers of the endpoint resources 108, one or more of the one or more semiconductor networking switches of the networking switch systems 110, the network switches 112 of the pods 106.1 through 106.*n*, one or more of the one or more semiconductor networking switches of the networking switches, and/or one or more of the one or more wired communication links 116, the one or more wired communication links 118, and/or the one or more wired communication links 120 may be unable to support this compression.

In these instances, the one or more fields of the headers of the first communication protocol or layer are to remain uncompressed.

Thereafter, the endpoint resources 108, the networking switch systems 110, the network switches 112 of the pods 106.1 through 106.n and/or the networking switches 114 frame the packets of the first communication protocol or layer in accordance with the first communication protocol or layer to generate frames of the first communication protocol or layer and send the frames of the first communication protocol or layer onto the endpoint resources 108, the networking switch systems 110, the network switches 112 of the pods 106.1 through 106.n and/or the networking switches 114.

Conventional Ethernet Packet

Figure 2:
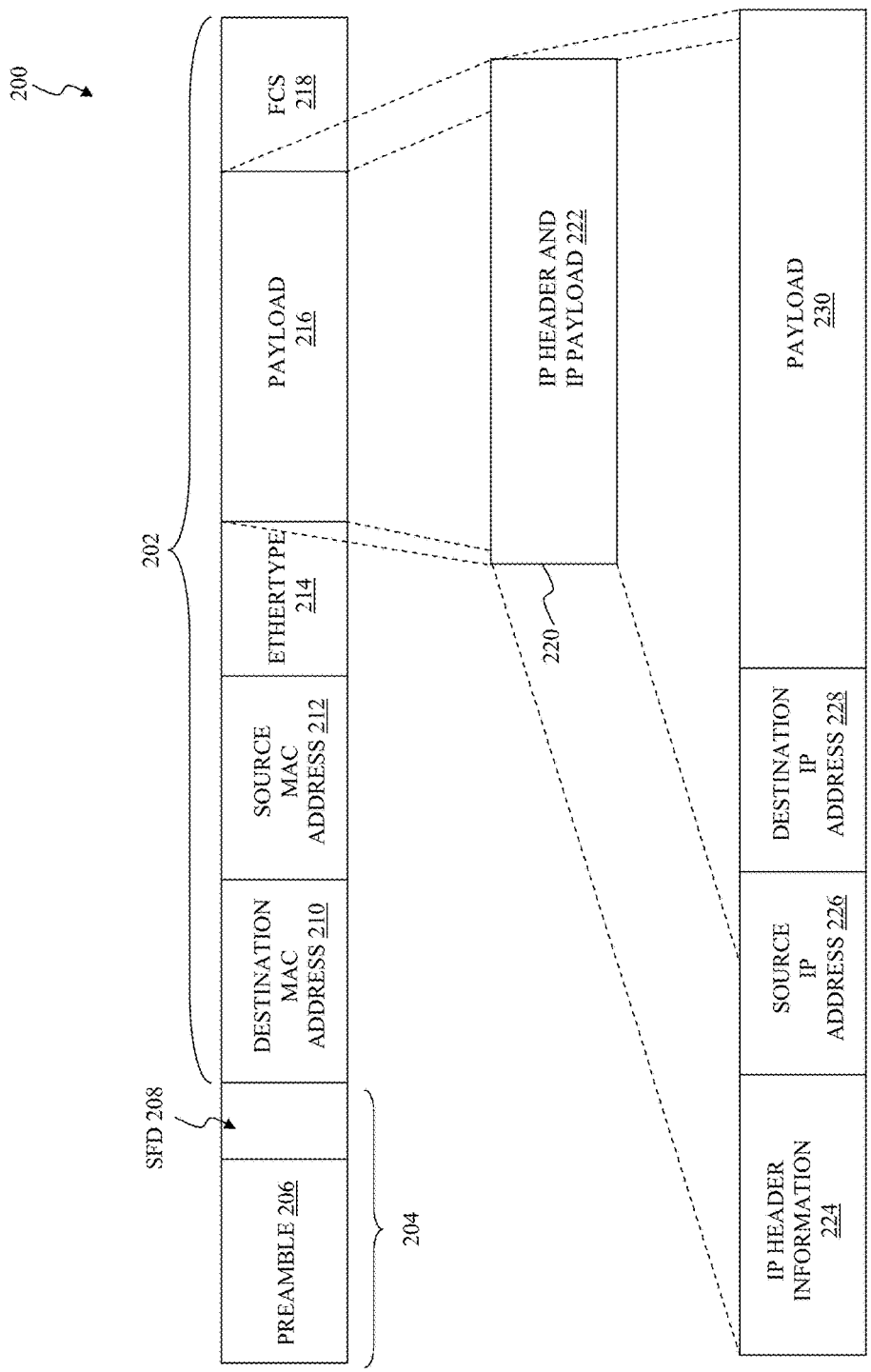
FIG. 2 illustrates a conventional Ethernet frame that can be used to communicate information within the exemplary network.

For example, FIG. 2 illustrates a conventional Ethernet frame that can be used to communicate information within the exemplary network. As illustrated in FIG. 2, a conventional Ethernet packet or frame 200 is a conventional Ethernet packet 202 encapsulated with a conventional Ethernet header 204. The conventional Ethernet header 204 includes a Preamble Field 206 and a start of packet delimiter (SFD) Field 208. The conventional Ethernet packet 202 includes an Ethernet Media Access Control (MAC) Destination Address Field 210, an Ethernet MAC Source Address Field 212, an Ethernet Type Field 214, a Payload 216, and a Frame Check Sequence (FCS) Field 218. Of pertinence to this disclosure are the Ethernet MAC Destination Address Field 210, the Ethernet MAC Source Address Field 212, and the Payload 216 which are to be discussed in further detail below. The Preamble Field 206, the SFD Field 208, the Ethernet Type Field 214, and the FCS Field 218 are all well-known conventional fields that are defined in accordance with the Institute of Electrical and Electronics Engineers (I.E.E.E.) 802.3 communication protocol and will not be discussed in further detail in FIG. 2.

The Ethernet MAC Destination Address Field 210 designates a MAC address of one or more receiving devices of the conventional Ethernet packet or frame 200 and the Ethernet MAC Source Address Field 212 designates a MAC address of a sending device for the conventional Ethernet packet or frame 200. The one or more receiving devices and/or the sending device can include one or more of the one or more servers of the endpoint resources 108 to provide some examples.

As illustrated in FIG. 2, the conventional Ethernet packet 202 includes the Payload 216. In the exemplary embodiment illustrated in FIG. 2, the Payload 216 includes a conventional Internet Protocol (IP) packet 220 having an IP Header and an IP Payload 222. The IP Header and the IP Payload 222 are formatted in accordance with a Layer 3 communication protocol, such as Internet Protocol version 4 (IPv4) or Internet Protocol version 6 (IPv6) to provide some examples. As additionally illustrated in FIG. 2, the IP Header and the IP Payload 222 includes IP Header Information 224, a Source IP Address Field 226, a Destination IP Address Field 228, and a Payload 230. The IP Header Information 224 and the Payload 230 are all well-known conventional fields that are defined in accordance with the IP communication protocol and will not be discussed in further detail in FIG. 2. For example, the IP Header Information 224 can include a Version Field, an IP Header Length Field, a Type of Service (ToS) Field, a Datagram Size Field, an Identification Field, a Flags Field, a Fragmentation Offset Field, a Time To Live Field, a Protocol Field, and/or a Header Checksum Field to provide some examples.

The Destination IP Address Field 228 designates an IP address of one or more receiving devices of the conventional IP packet 220 and the Source IP Address Field 226 designates an IP address of a sending device for the conventional IP packet 220. The one or more receiving devices and/or the sending device can include one or more of the one or more servers of the endpoint resources 108 to provide some examples.

As discussed above, the Ethernet MAC Destination Address Field 210 and the Ethernet MAC Source Address Field 212 refer to a MAC address of the one or more receiving devices and one or more MAC addresses of the sending device, respectively. Similarly, the Destination IP Address Field 228 and the Source IP Address Field 226 refer to an IP address of the one or more receiving devices and one or more IP addresses of the sending device respectively.

Ethernet Packets or Frames of the Present Disclosure

As discussed above, the Ethernet MAC Destination Address Field 210 and the Destination IP Address Field 228 both refer to the one or more receiving devices and the Ethernet MAC Source Address Field 212 and the Source IP Address Field 226 both refer to the sending device. As such, Ethernet packets or frames of the present disclosure compress the Ethernet MAC Destination Address Field 210 and the Ethernet MAC Source Address Field 212. In a first exemplary embodiment, this compression is indicated in the Ethernet packets or frames of the present disclosure through the inclusion of a Payload-Type Information Field. Alternatively, in a second exemplary embodiment, this compression is indicated in the Ethernet packets or frames of the present disclosure by augmenting the conventional SFD Field 208.

Figure 3:
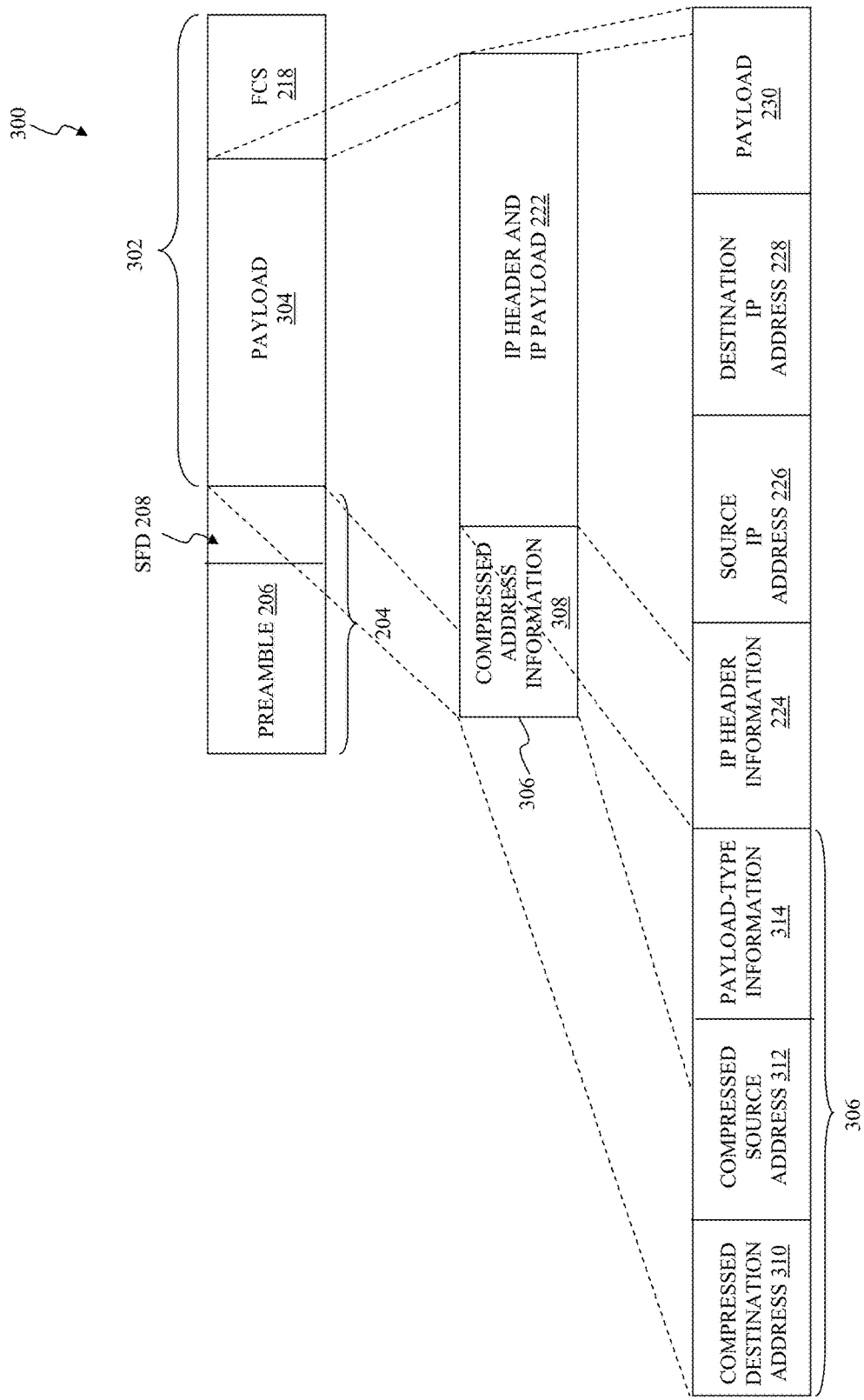
FIG. 3 illustrates a first exemplary Ethernet packet or frame that can be used to communicate information within the exemplary network.

FIG. 3 illustrates a first exemplary Ethernet packet or frame that can be used to communicate information within the exemplary network. As illustrated in FIG. 3, an Ethernet packet or frame 300 includes an Ethernet packet 302 encapsulated with the conventional Ethernet header 204. The Ethernet packet 302 includes a Payload 304 and the FCS Field 218. The Ethernet MAC Destination Address Field 210, the Ethernet MAC Source Address Field 212, and the Ethernet Type Field 214, which are present in the conventional Ethernet packet 202 as illustrated in FIG. 2, are not included within the Ethernet packet 302.

Rather, in the exemplary embodiment illustrated in FIG. 3, the Payload 304 includes an Internet Protocol (IP) packet 306 having a Compressed Address Information Field 308 and the IP Header and the IP Payload 222. The Compressed Address Information Field 308 includes a Compressed Destination Address Field 310, a Compressed Source Address Field 312, and a Payload-Type Information Field 314. The Compressed Destination Address Field 310 and the Compressed Source Address Field 312 represent compressed representations of the Ethernet MAC Destination Address Field 210 and the Ethernet MAC Source Address Field 212, respectively. This compression can be performed using any suitable well-known data compression algorithm that will be apparent to those skilled in the relevant art(s) without departing from the spirit and scope of the present disclosure. The Payload-Type Information Field 314 indicates whether the Payload 304 is compressed, namely whether the Payload 304 includes the Compressed Destination Address Field 310 and/or the Compressed Source Address Field 312. The Payload-Type Information Field 314 can optionally indicate the well-known data compression algorithm used to generate the Compressed Destination Address Field 310 and/or the Compressed Source Address Field 312.

Figure 4:
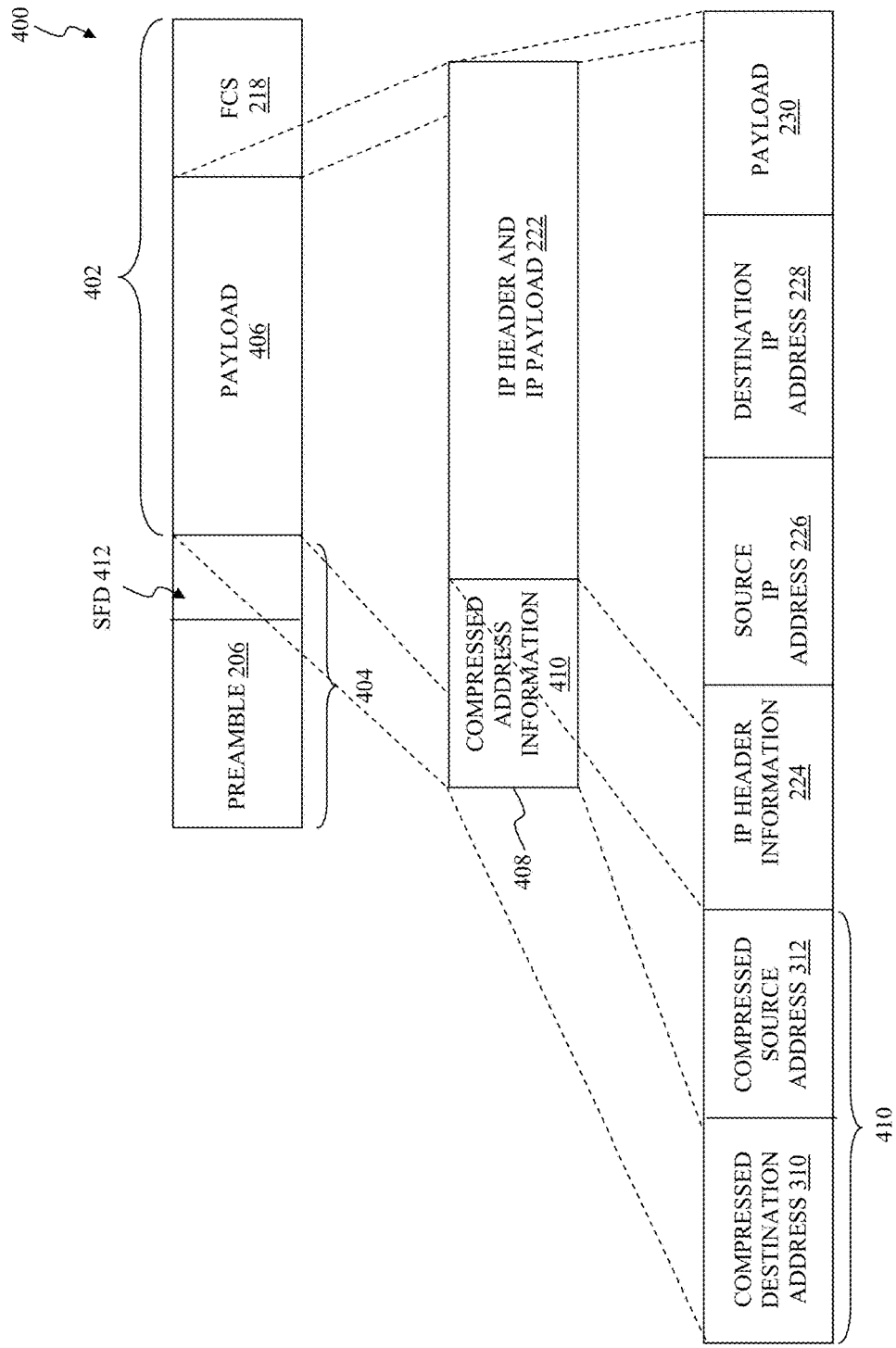
FIG. 4 illustrates a second exemplary Ethernet packet or frame that can be used to communicate information within the exemplary network.

FIG. 4 illustrates a second exemplary Ethernet packet or frame that can be used to communicate information within the exemplary network. As illustrated in FIG. 4, an Ethernet packet or frame 400 includes an Ethernet packet 402 encapsulated with an Ethernet header 404. The Ethernet packet 402 includes a Payload 406 and the FCS Field 218. The Ethernet MAC Destination Address Field 210, the Ethernet MAC Source Address Field 212, and the Ethernet Type Field 214, which are present in the conventional Ethernet packet 202 as illustrated in FIG. 2, are not included within the Ethernet packet 402. Rather, in the exemplary embodiment illustrated in FIG. 4, the Payload 406 includes an Internet Protocol (IP) packet 408 having a Compressed Address Information Field 410 and the IP Header and the IP Payload 222. The Compressed Address Information Field 410 includes the Compressed Destination Address Field 310 and the Compressed Source Address Field 312 as described above in FIG. 3.

The Ethernet header 404 includes a SFD Field 412. The SFD Field 412 is substantially similar to the SFD 208 as discussed in FIG. 2; however, the SFD Field 412 further indicates whether the Payload 406 is compressed, namely whether the Payload 406 includes the Compressed Destination Address Field 310 and/or the Compressed Source Address Field 312. The SFD Field 412 can additionally include the well-known data compression algorithm used to generate the Compressed Destination Address Field 310 and/or the Compressed Source Address Field 312. In an exemplary embodiment, the SFD Field 412 may assume one of many possible values to indicate a type of the Payload 406, for example, whether the Payload includes the Compressed Destination Address Field 310 and/or the Compressed Source Address Field 312.

As discussed in FIG. 1, the endpoint resources 108, the networking switch systems 110, the network switches 112 of the pods 106.1 through 106.$n$ and/or the networking switches 114 frame the packets of the first communication protocol or layer in accordance with the first communication protocol or layer to generate frames of the first communication protocol or layer and send the frames of the first communication protocol or layer onto the endpoint resources 108, the networking switch systems 110, the network switches 112 of the pods 106.1 through 106.$n$ and/or the networking switches 114. Thereafter, the endpoint resources 108, the networking switch systems 110, the network switches 112 of the pods 106.1 through 106.$n$ and/or the networking switches 114 de-frame the frames of the first communication protocol or layer in accordance with the first communication protocol or layer to recover the packets of the first communication protocol or layer. Next, the endpoint resources 108, the networking switch systems 110, the network switches 112 of the pods 106.1 through 106.$n$ and/or the networking switches 114 determine whether one or more fields of headers of the packets of the first communication protocol or layer have been compressed. If so, the networking switch systems 110, and/or the network switches 112 of the pods 106.1 through 106.$n$ decompress the one or more fields of the headers of the packets of the first communication protocol or layer into one or more fields of the headers of the first communication protocol or layer and one or more fields of the headers of the second communication protocol or layer. Thereafter, the endpoint resources 108, the networking switch systems 110, the network switches 112 of the pods 106.1 through 106.$n$ and/or the networking switches 114 parse the headers of the first communication protocol or layer to recover the packets of the first communication protocol or layer.

Exemplary Operation of the Exemplary Network

Figure 5:
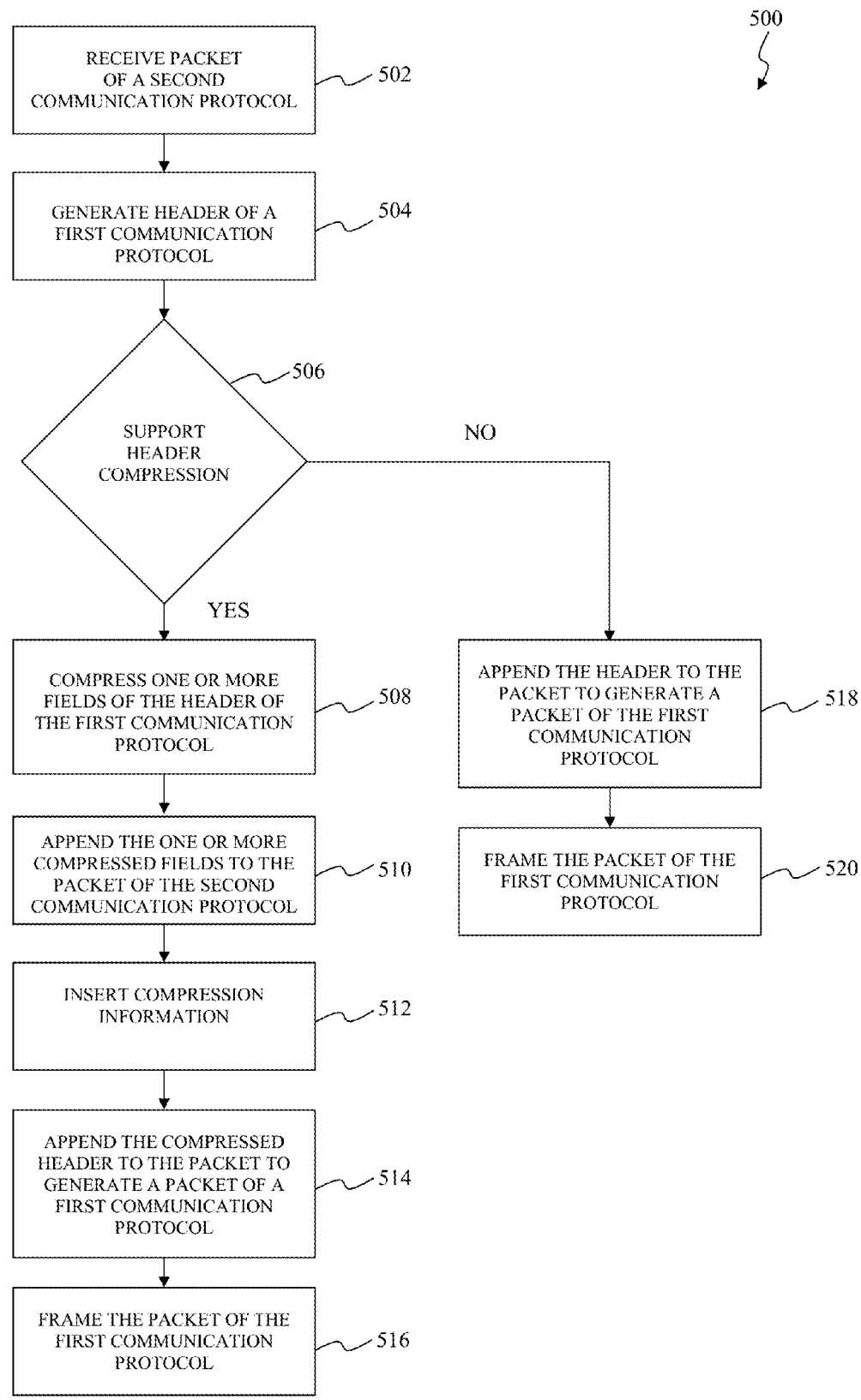
FIG. 5 is a flowchart of exemplary operational steps of the exemplary network in a transmission mode of operation according to an exemplary embodiment of the present disclosure.

FIG. 5 is a flowchart of exemplary operational steps of the exemplary network in a transmission mode of operation according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 500 of a network, such as the network 100 to provide an example, in the transmission mode of operation The various steps as to be described below, can be performed by the endpoint resources 108, the networking switch systems 110, the network switches 112 of the pods 106.1 through 106.$n$ and/or the networking switches 114 operating individually or in combination.

At step 502, the operational control flow 500 receives a packet of a second communication protocol or layer, such as the conventional IP packet 220 to provide an example.

At step 504, the operational control flow 500 generates a header of a first communication protocol or layer to be appended to the packet of the second communication protocol or layer of step 502. The header of the first communication protocol or layer can include one or more of: the Ethernet MAC Destination Address Field 210, the Ethernet MAC Source Address Field 212, and/or the Ethernet Type Field 214 to provide some examples.

At step 506, the operational control flow 500 determines whether header compression is supported within the network 100. The operational control flow 500 can make this determination on a per-packet basis or a per-link basis. In the per-packet basis, the operational control flow 500 determines whether one or more receiving devices, such as one or more of the one or more servers of the endpoint resources 108 to provide some examples, support header compression. Otherwise, in the per-link basis, the operational control flow 500 determines whether each communication link, such as one or more wired communication links 116, one or more wired communication links 118, and/or one or more wired communication links 120 to provide some examples, between a sending device, such as the endpoint resources 108, the networking switch systems 110, the network switches 112 of the pods 106.1 through 106.$n$ and/or the networking switches 114 to provide some examples, and the one or more receiving devices support header compression. In an exemplary embodiment, the operational control flow 500 can make this determination using a capabilities table listing whether the endpoint resources 108, the networking switch systems 110, the network switches 112 of the pods 106.1 through 106.$n$ and/or the networking switches 114 and their corresponding one or more wired communication links 116, one or more wired communication links 118, and/or one or more wired communication links 120 can support header compression. If the operational control flow 500 determines the header compression is supported within the network, the operational control flow 500 proceeds to step 508. Otherwise, the operational control flow 500 proceeds to step 518 when the header compression is not supported within the network.

At step 508, the operational control flow 500 compresses one or more fields of the header of the first communication protocol or layer of step 504, such as the Ethernet MAC Destination Address Field 210, the Ethernet MAC Source Address Field 212, and/or the Ethernet Type Field 214 to provide some examples, to generate one or more compressed fields, such as the Compressed Destination Address Field 310 and/or the Compressed Source Address Field 312 to provide some examples. Thereafter, the operational control flow 500 removes the one or more fields of the header of the first communication protocol or layer of step 504 from the header of the first communication protocol or layer of step 504 to generate a compressed header of the first communication protocol or layer.

At step 510, the operational control flow 500 appends the one or more compressed fields of step 508 to the packet of the second communication protocol or layer of step 502.

At step 512, the operational control flow 500 inserts compression information, such as the Payload-Type Information Field 314 or the SFD Field 412 to provide some examples, into the packet of the second communication protocol or layer of step 502. For example, this compression information indicates the packet of the second communication protocol or layer of step 502 includes the one or more compressed fields of step 508. The compression information can optionally indicate well-known data compression algorithm used to compress the one or more fields of the header of the first communication protocol or layer in step 508.

At step 514, the operational control flow 500 appends the compressed header of the first communication protocol or layer from step 508 to generate a packet of the first communication protocol or layer, such as the Ethernet packet 302 and/or the Ethernet packet 402 to provide some examples.

At step 516, the operational control flow 500 frames the packet of the first communication protocol or layer of step 514 in accordance with the first communication protocol or layer to generate a frame of the second communication protocol or layer, such as the Ethernet packet or frame 300 and/or the Ethernet packet or frame 400 to provide some examples.

At step 518, the operation control flow appends the header of the first communication protocol or layer from step 504 to generate a packet of the first communication protocol or layer, such as the conventional Ethernet packet 202 to provide an example.

At step 520, the operational control flow 500 frames the packet of the first communication protocol or layer of step 518 in accordance with the first communication protocol or layer to generate a frame of the second communication protocol or layer, such as the conventional Ethernet packet or frame 200 to provide an example.

Figure 6:
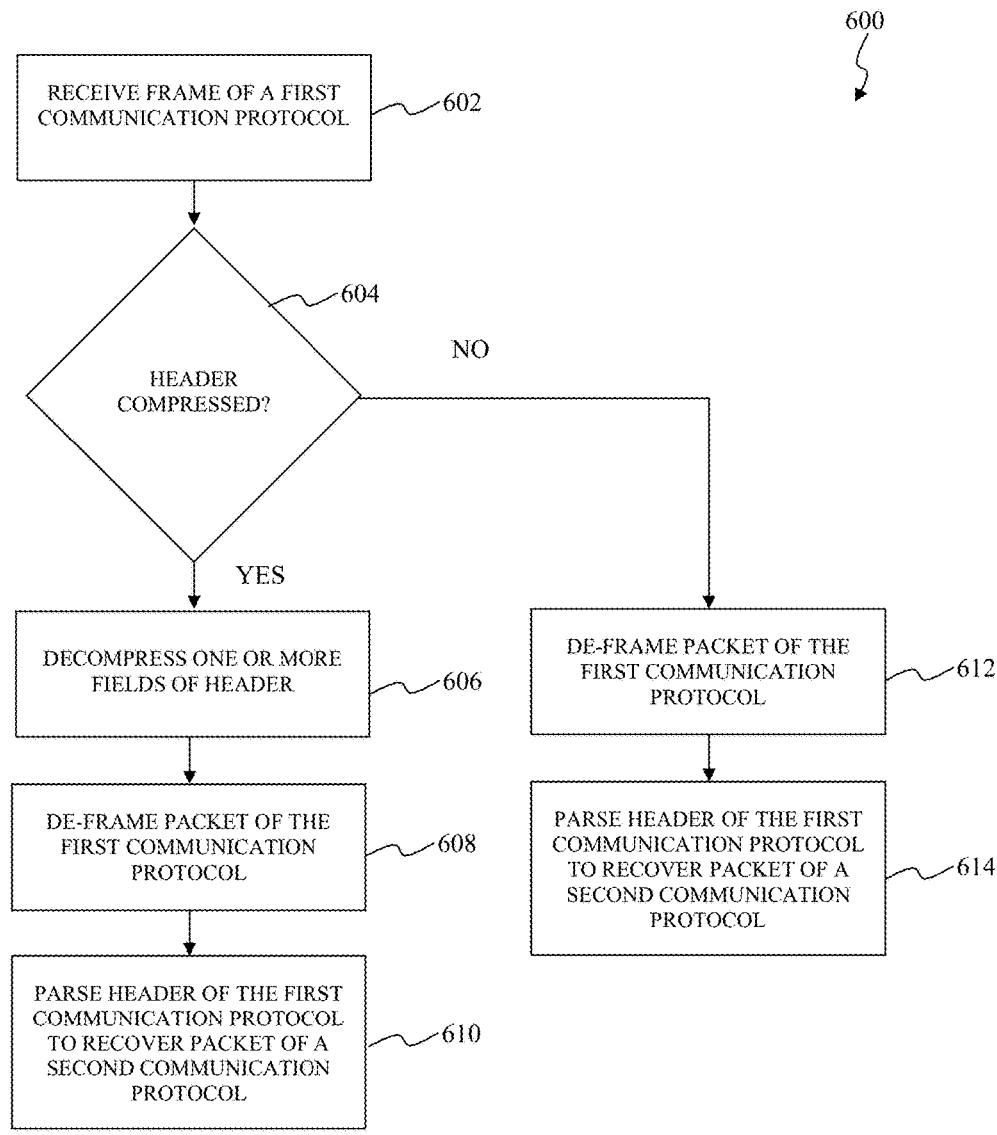
FIG. 6 is a flowchart of exemplary operational steps of the exemplary network in a receiving mode of operation according to an exemplary embodiment of the present disclosure.

FIG. 6 is a flowchart of exemplary operational steps of the exemplary network in a receiving mode of operation according to an exemplary embodiment of the present disclosure. The disclosure is not limited to this operational description Rather, it will be apparent to ordinary persons skilled in the relevant art(s) that other operational control flows are within the scope and spirit of the present disclosure. The following discussion describes an exemplary operational control flow 600 of a network, such as the network 100 to provide an example, in the receiving mode of operation. The various steps as to be described below, can be performed by the endpoint resources 108, the networking switch systems 110, the network switches 112 of the pods 106.1 through 106.n and/or the networking switches 114 operating individually or in combination.

At step 602, the operational control flow 600 receives a frame, such as the conventional Ethernet packet or frame 200, the Ethernet packet or frame 300, and/or the Ethernet packet or frame 400 to provide some examples, of a first communication protocol or layer.

At step 604, the operational control flow 600 determines whether a header of the packet of the first communication protocol or layer of step 602 has been compressed. The operational control flow 600 can examine one or more fields, such as the Payload-Type Information Field 314 or the SFD Field 412 to provide some examples, Ethernet Type Field 214 to provide an example, of the header of the packet of the first communication protocol or layer of step 604. If the operational control flow 600 determines the header of the packet of the first communication protocol or layer of step 602 has been compressed, the operational control flow 600 proceeds to step 606. Otherwise, the operational control flow proceeds to step 612.

At step 606, the operational control flow 600 decompresses one or more fields, such as the Compressed Destination Address Field 310 and/or the Compressed Source Address Field 312 to provide some examples, of the frame of the first communication protocol or layer of step 602. The operational control flow 600 can optionally insert these decompressed fields, such as the Ethernet MAC Destination Address Field 210 and/or the Ethernet MAC Source Address Field 210, into the frame of the first communication protocol or layer of step 602.

At step 606, the operational control flow 600 de-frames the frame of the first communication protocol or layer of step 602 in accordance with the first communication protocol or layer to generate a packet of the first communication protocol or layer, such as the Ethernet packet 302 and/or the Ethernet packet 402 to provide some examples.

At step 610, the operational control flow 600 parses a header of the packet of the first communication protocol or layer of step 606 to recover a packet of the second communication protocol or layer, such as the IP packet 306 or the IP packet 408 to provide some examples.

At step 612, the operational control flow 600 de-frames the frame of the first communication protocol or layer of step 602 in accordance with the first communication protocol or layer to generate a packet of the first communication protocol or layer, such as the conventional Ethernet packet 202 to provide an example.

At step 614, the operational control flow 600 parses the header of the packet of the first communication protocol or layer of step 602 to recover a packet of the second communication protocol or layer, such as the conventional IP packet 220 to an example.

Figure 7:
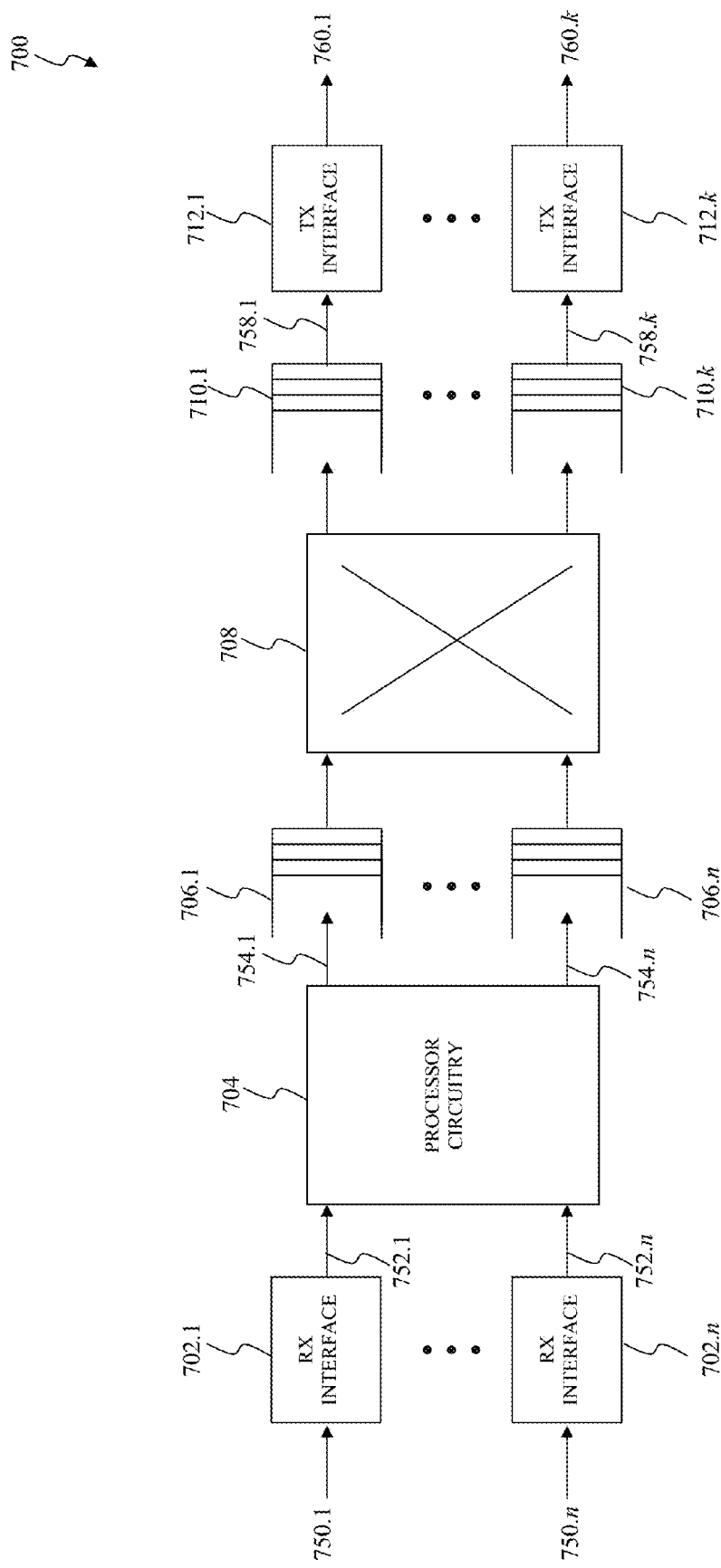
FIG. 7 illustrates an exemplary network switch that can be implemented within the network according to an exemplary embodiment of the present disclosure.

Exemplary Networking Switch that can be Implemented within the Exemplary Network FIG. 7 illustrates an exemplary network switch that can be implemented within the network according to an exemplary embodiment of the present disclosure. A networking switch 700 selectively routes packets within a network, such as the network 100 to provide an example. The network switch 700 includes receiving (RX) interfaces 702.1 through 702.n, packet processing circuitry 704, receiving frame queues 706.1 through 706.n, a network switch 708, transmitting frame queues 710.1 through 710.k, and transmitting (TX) interfaces 712.1 through 712.k. The network switch 700 can represent an exemplary embodiment of one or more of: the one or more semiconductor networking switches of the networking switch systems 110, the one or more semiconductor networking switches of the networking switch systems 112, and/or the one or more semiconductor networking switches of the core network layer 114.

For the purposes of this discussion, the term "packet processing circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

The RX interfaces 702.1 through 702.n receive frames 750.1 through 750.n from the packet switched network. The frames 750.1 through 750.n represent frames of a first communication protocol or layer, such as, for example, a Layer 2 communication protocol, such as Ethernet to provide an example, that are embedded with packets of a second communication protocol or layer, such as, for example, a Layer 3 communication protocol, such as Internet Protocol version 4 (IPv4) or Internet Protocol version 6 (IPv6) to provide some examples. In an exemplary embodiment, the frames 750.1 through 750.n represent Ethernet frames that are embedded with IP packets such as the conventional Ethernet packet or frame 200, the Ethernet packet or frame 300, and/or the Ethernet packet or frame 400 to provide some examples as discussed above in FIG. 2 through FIG. 4. The RX interfaces 702.1 through 702.n represent physical layer (PHY) interfaces between the networking switch 700 and the packet switched network. Generally, the RX interfaces 702.1 through 702.n demodulate, decode, and/or convert the frames 750.1 through 750.n to provide recovered frames 752.1 through 752.n.

The packet processing circuitry 704 controls the overall configuration and/or operation of the networking switch 700. For example, the processor circuitry 704 examines the recovered frames 752.1 through 752.n to determine a frame type of each of the recovered frames 752.1 through 752.n, for example whether the recovered frames 752.1 through 752.n are of a compressed frame type or an uncompressed frame type. Next, in this example, the packet processing circuitry 704 determines whether each of the recovered frames 752.1 through 752.n should be compressed or uncompressed. In an exemplary embodiment, this determination is performed using a first compression table listing whether one or more receiving devices of the recovered frames 752.1 through 752.n and/or communication links between the networking switch 700 and the one or more receiving devices support compression.

If one or more of the recovered frames 752.1 through 752.n should be compressed and are not compressed, the packet processing circuitry 704 compresses one or more fields of headers of the first communication protocol or layer of the recovered frames 752.1 through 752.n. Otherwise, if one or more of the recovered frames 752.1 through 752.n should not be compressed and are compressed, the packet processing circuitry 704 decompresses the one or more fields of headers of the first communication protocol or layer. In another exemplary embodiment, the packet processing circuitry 704 uses a second compression table to perform this compression and/or decompression. Thereafter, the packet processing circuitry 704 provides the recovered frames 752.1 through 752.n as recovered frames 754.1 through 754.n to the receiving frame queues 706.1 through 706.n.

The receiving frame queues 706.1 through 706.n store the recovered frames 754.1 through 754.n. In an exemplary embodiment, the receiving frame queues 706.1 through 706.n are implemented as first in, first out (FIFO) queues.

The network switch 708 selectively couples the receiving frame queues 706.1 through 706.n to corresponding one or more of the transmitting frame queues 710.1 through 710.k. The number of transmitting frame queues from among the transmitting frame queues 710.1 through 710.k can be similar to or different from the number of transmitting frame queues from among the receiving frame queues 706.1 through 706.n. In an exemplary embodiment, this selective coupling is performed under control of the packet processing circuitry 704 using a routing table. For example, the network switch 708 can selectively couple a first receiving frame queue from among the receiving frame queues 706.1 through 706.n to one or more of transmitting frame queues from among the transmitting frame queues 710.1 through 710.k. In this example, frames leaving the first receiving frame queue are routed to the one or more of transmitting frame queues.

The transmitting frame queues 710.1 through 710.n store recovered frames from their corresponding receiving frame queues 706.1 through 706.n. In an exemplary embodiment, the transmitting frame queues 710.1 through 710.n are implemented as first in, first out (FIFO) queues.

The TX interfaces 712.1 through 712.k route frames 758.1 through 758.k stored in the transmitting frame queues 710.1 through 710.k as frames 760.1 through 760.k for transmission over the packet switched network. The TX interfaces 712.1 through 712.k represent physical layer (PHY) interfaces between the networking switch 700 and the packet switched network. Generally, the TX interfaces 712.1 through 712.k modulate, encode, and/or convert the frames 758.1 through 758.k to provide the frames 760.1 through 760.k. The frames 760.1 through 760.k represent frames of the first communication protocol or layer that are embedded with packets of the second communication protocol or layer. In an exemplary embodiment, the frames 760.1 through 760.k represent Ethernet frames that are embedded with IP packets such as the conventional Ethernet packet or frame 200, the Ethernet packet or frame 300, and/or the Ethernet packet or frame 400 to provide some examples as discussed above in FIG. 2 through FIG. 4.

Figure 8:
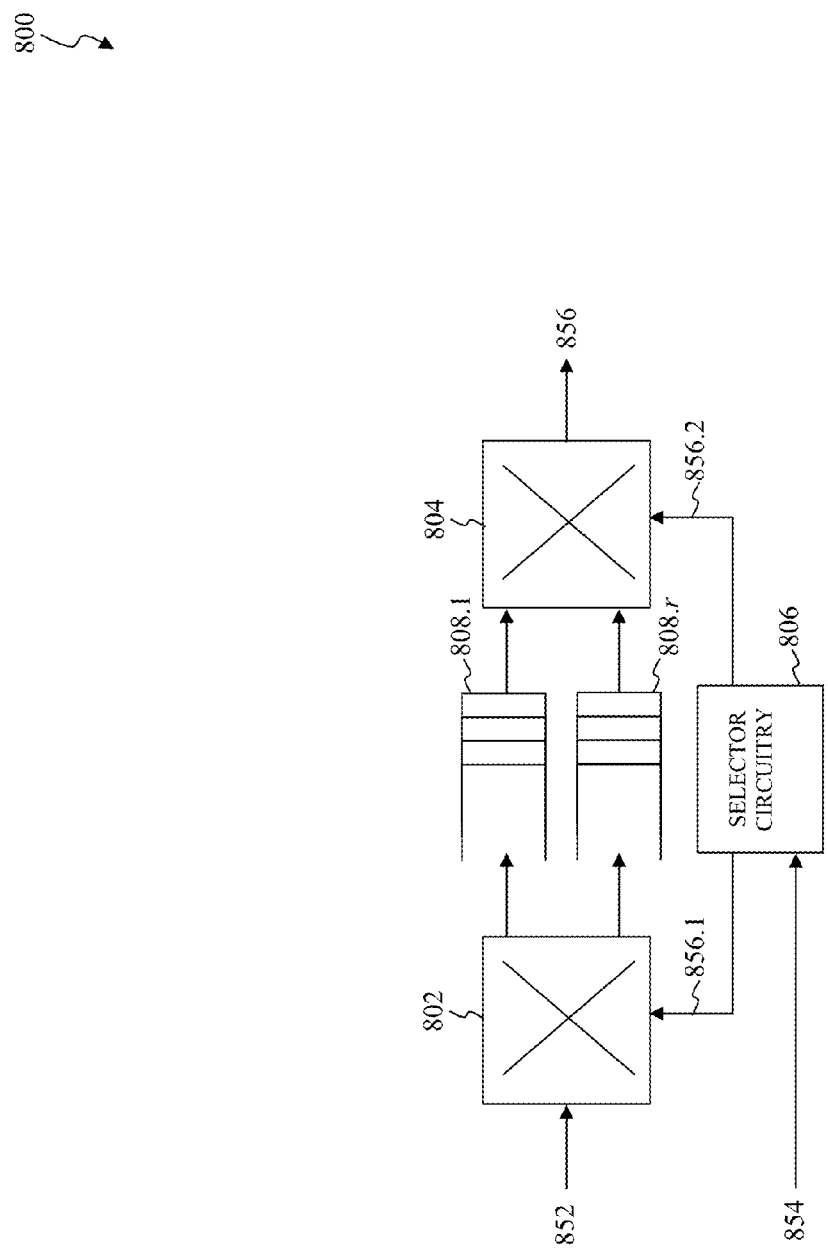
FIG. 8 illustrates an exemplary frame queue that can be implemented within the exemplary network switch or an exemplary endpoint of the network according to an exemplary embodiment of the present disclosure.

Exemplary Frame Queue that can be Implemented within the Exemplary Networking Switch or an Exemplary Endpoint FIG. 8 illustrates an exemplary frame queue that can be implemented within the exemplary network switch or an exemplary endpoint according to an exemplary embodiment of the present disclosure. As illustrated in FIG. 8, the frame queue 800 selectively stores one or more frames. In an exemplary embodiment, the one or more frames represent Ethernet frames that are embedded with IP packets such as the conventional Ethernet packet or frame 200, the Ethernet packet or frame 300, and/or the Ethernet packet or frame 400 to provide some examples as discussed above in FIG. 2 through FIG. 4. The frame queue 800 includes a first switching network or multiplexer 802, a second switching network or multiplexer 804, selector circuitry 806, and frame-type queues 808.1 through 808.r. The frame queue 800 can represent an exemplary embodiment of one or more of the receiving frame queues 706.1 through 706.n and/or the transmitting frame queues 710.1 through 710.n. Alternatively, or in addition to, the frame queue 800 can be implemented within an endpoint of a wired network, such as the endpoint resources 108 of the pods 106.1 through 106.$n$ to provide an example.

As illustrated in FIG. 8, the first switching network or multiplexer 802 selectively routes a frame 852, such as one of the recovered frames 754.1 through 754.$n$ to provide an example, to a corresponding one of the frame-type queues 808.1 through 808.$r$. The second switching network or multiplexer 804 selectively routes a frame stored in one of the frame-type queues 808.1 through 808.$r$ to provide a frame 856.

The selector circuitry 806 configures the first switching network or multiplexer 802 and the second switching network or multiplexer 804 in response to a frame type indictor 854 provide by processor circuitry, such as the packet processing circuitry 704. In an exemplary embodiment, the frame type indictor 854 indicates whether the frame 852 includes one or more fields are compressed. In another exemplary embodiment, the frame type indictor 854 indicates a specific type of the frame 852, such as the conventional Ethernet packet or frame 200, the Ethernet packet or frame 300, and/or the Ethernet packet or frame 400 to provide some examples as discussed above in FIG. 2 through FIG. 4. As illustrated in FIG. 8, the selector circuitry 806 provides a first switching control signal 856.1 and a second switching control signal 856.2 to configure the first switching network or multiplexer 802 and the second switching network 802 to route the frame 852 to/from one of the packet-type queues from among the frame-type queues 808.1 through 808.$r$ based on the frame type indictor 854.

The frame-type queues 808.1 through 808.$r$ includes different queues for each of the frame types within the packet switched network. In an exemplary embodiment, the frame-type queues 808.1 through 808.$r$ include three (3) frame-type queues 808.1 through 808.3. In this exemplary embodiment, frames stored in the frame-type queue 808.1 represent frames of the conventional Ethernet packet or frame 200, frames stored in the frame-type queue 808.2 represent frames of the Ethernet packet or frame 300, and frames stored in the frame-type queue 808.3 represent frames of the Ethernet packet or frame 400. In another exemplary embodiment, the frame-type queues 808.1 through 808.$r$ include two (2) frame-type queues 808.1 through 808.2. In this exemplary embodiment, frames stored in the frame-type queue 808.1 represent frames having no compressed fields, such as the conventional Ethernet packet or frame 200 to provide an example, and frames stored in the frame-type queue 808.2 represent frames having one or more fields that are compressed, such as the Ethernet packet or frame 300 and/or the Ethernet packet or frame 400 to provide an example.

CONCLUSION

The Detailed Description referred to accompanying figures to illustrate exemplary embodiments consistent with the disclosure. References in the disclosure to "an exemplary embodiment" indicates that the exemplary embodiment described include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based on the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. An apparatus, comprising:
   a plurality of receiving frame queues configured to receive a first plurality of frames;
   a plurality of transmitting frame queues configured to receive a second plurality of frames;
   a memory that stores instructions; and
   packet processing circuitry configured to execute the instructions, which, when executed by the packet processing circuitry, configure the packet processing circuitry to:
     receive a first frame from among the first plurality of frames, the first frame including a first header that is formatted in accordance with a first communication protocol or layer and a second header that is formatted in accordance with a second communication protocol or layer, wherein one or more second fields from the second header are compressed as conveying similar information as one or more first fields of the first header,
     determine whether the one or more second fields from the second header should be compressed or uncompressed,
     decompress the one or more second fields from the second header that convey the similar information as the one or more first fields of the first header when the one or more second fields from the second header should be uncompressed to provide a decompressed first frame, and
     provide the first frame as a second frame from among the second plurality of frames when the one or more second fields from the second header should be compressed or the decompressed first frame as the second frame from among the second plurality of frames when the one or more second fields from the second header should be uncompressed.

2. The apparatus of claim 1, wherein the first communication protocol or layer comprises:
a Layer 3 communication protocol, and
wherein the second communication protocol or layer comprises:
a Layer 2 communication protocol.

3. The apparatus of claim 1, further comprising:
a switching network configured to route the second frame to a corresponding transmitting frame queue from among the plurality of transmitting frame queues that is associated with compressed frames.

4. The apparatus of claim 1, wherein the apparatus is implemented within a leaf network layer of a leaf-and-spine networking architecture or a spine network layer of the leaf-and-spine networking architecture.

5. A method for operating a network, the method comprising:
receiving, by the network, a first frame including a first header that is formatted in accordance with a first communication protocol or layer and a second header that is formatted in accordance with a second communication protocol or layer, wherein one or more second fields from the second header are compressed as conveying similar information as one or more first fields of the first header;
determining, by the network whether the one or more second fields from the second header should be compressed or uncompressed,
decompressing, by the network, the one or more second fields from the second header that convey the similar information as the one or more first fields of the first header when the one or more second fields from the second header should be uncompressed to provide a decompressed first frame; and
providing, by the network, the first frame as a second frame from among a second plurality of frames when the one or more second fields from the second header should be compressed or the decompressed first frame as the second frame from among the second plurality of frames when the one or more second fields from the second header should be uncompressed.

6. The method of claim 5, wherein the first communication protocol or layer comprises:
a Layer 3 communication protocol, and
wherein the second communication protocol or layer comprises:
a Layer 2 communication protocol.

7. A network, comprising:
a leaf network layer having one or more servers and one or more first networking switches; and
a spine network layer, communicatively coupled to the leaf network layer, having one or more second networking switches,
wherein the one or more first networking switches or the one or more second networking switches comprise:
a plurality of receiving frame queues configured to receive a first plurality of frames;
a plurality of transmitting frame queues configured to receive a second plurality of frames;
a memory that stores instructions; and
packet processing circuitry configured to execute the instructions, which, when executed by the packet processing circuitry, configure the packet processing circuitry to:
receive a first frame from among the first plurality of frames, the first frame including a first header that is formatted in accordance with a first communication protocol or layer and a second header that is formatted in accordance with a second communication protocol or layer, wherein one or more second fields from the second header are compressed as conveying similar information as one or more first fields of the first header,
determine whether the one or more second fields from the second header should be compressed or uncompressed,
decompress the one or more second fields from the second header that convey the similar information as the one or more first fields of the first header when the one or more second fields from the second header should be uncompressed to provide a decompressed first frame, and
provide the first frame as a second frame from among the second plurality of frames when the one or more second fields from the second header should be compressed or the decompressed first frame as the second frame from among the second plurality of frames when the one or more second fields from the second header should be uncompressed.

8. The network of claim 7, wherein the first communication protocol or layer comprises:
a Layer 3 communication protocol, and
wherein the second communication protocol or layer comprises:
a Layer 2 communication protocol.

9. The apparatus of claim 1, wherein the one or more first fields of the first header and the one or more second fields from the second header comprise:
a source address of the first frame; or
a destination address for the second frame.

10. The apparatus of claim 9, wherein the source address of the first frame comprises;
a source Internet Protocol (IP) address, or
a Media Access Control (MAC) source address, and
wherein the destination address for the second frame comprises:
a destination IP address; or
a MAC destination address.

11. The apparatus of claim 2, wherein the Layer 2 communication protocol comprises:
Ethernet, and
wherein the Layer 3 communication protocol comprises:
Internet Protocol version 4 (IPv4); or
Internet Protocol version 6 (IPv6).

12. The method of claim 5, wherein the one or more first fields of the first header and the one or more second fields from the second header comprise:
a source address of the first frame; or
a destination address for the second frame.

13. The method of claim 12, wherein the source address of the first frame comprises:
a source Internet Protocol (IP) address, or
a Media Access Control (MAC) source address, and
wherein the destination address for the second frame comprises:
a destination IP address; or
a MAC destination address.

14. The network of claim 7, wherein the one or more first fields of the first header and the one or more second fields from the second header comprise:
a source address of the first frame; or
a destination address for the second frame.

15. The network of claim 14, wherein the source address of the first frame comprises:
a source Internet Protocol (IP) address, or
a Media Access Control (MAC) source address, and
wherein the destination address for the second frame comprises:
a destination IP address; or
a MAC destination address.

16. The network of claim 8, wherein the Layer 2 communication protocol comprises:
Ethernet, and
wherein the Layer 3 communication protocol comprises:
Internet Protocol version 4 (IPv4); or
Internet Protocol version 6 (IPv6).

17. The apparatus of claim 1, wherein the plurality of transmitting frame queues are associated with a plurality of receiving devices,
wherein the memory further stores a capabilities table listing whether each of the plurality of receiving devices support compression,
wherein the instructions, when executed by the packet processing circuitry, further configure the packet processing circuitry to identify a receiving device from among the plurality of receiving devices destined to receive the first frame, and
wherein the instructions, when executed by the packet processing circuitry, configure the packet processing circuitry to determine whether the one or more second fields from the second header should be compressed or uncompressed based on information corresponding to the receiving device from the capabilities table.

18. The apparatus of claim 1, wherein the plurality of transmitting frame queues are associated with a plurality of receiving devices,
wherein the memory further stores a capabilities table listing whether a plurality of communication links associated with the plurality of receiving devices support compression,
wherein the instructions, when executed by the packet processing circuitry, further configure the packet processing circuitry to identify a receiving device from among the plurality of receiving devices destined to receive the first frame, and
wherein the instructions, when executed by the packet processing circuitry, configure the packet processing circuitry to determine whether the one or more second fields from the second header should be compressed or uncompressed based on information corresponding to a communication link from among the plurality of communication links that corresponds to the receiving device from the capabilities table.

19. The method of claim 5, further comprising:
identifying, by the network, a receiving device from among the plurality of receiving devices destined to receive the first frame, and
wherein the determining comprises:
determining whether the one or more second fields from the second header should be compressed or uncompressed based on information corresponding to the receiving device from a capabilities table.

20. The method of claim 5, further comprising:
identifying, by the network, a receiving device from among the plurality of receiving devices destined to receive the first frame, and
wherein the determining comprises:
determining whether the one or more second fields from the second header should be compressed or uncompressed based on information corresponding to a communication link from among a plurality of communication links that corresponds to the receiving device from a capabilities table.

21. The network of claim 7, wherein the plurality of transmitting frame queues are associated with a plurality of receiving devices,
wherein the memory further stores a capabilities table listing whether each of the plurality of receiving devices support compression,
wherein the instructions, when executed by the packet processing circuitry, further configure the packet processing circuitry to identify a receiving device from among the plurality of receiving devices destined to receive the first frame, and
wherein the instructions, when executed by the packet processing circuitry, configure the packet processing circuitry to determine whether the one or more second fields from the second header should be compressed or uncompressed based on information corresponding to the receiving device from the capabilities table.

22. The network of claim 7, wherein the plurality of transmitting frame queues are associated with a plurality of receiving devices,
wherein the memory further stores a capabilities table listing whether a plurality of communication links associated with the plurality of receiving devices support compression,
wherein the instructions, when executed by the packet processing circuitry, further configure the packet processing circuitry to identify a receiving device from among the plurality of receiving devices destined to receive the first frame, and
wherein the instructions, when executed by the packet processing circuitry, configure the packet processing circuitry to determine whether the one or more second fields from the second header should be compressed or uncompressed based on information corresponding to a communication link from among the plurality of communication links that corresponds to the receiving device from the capabilities table.

* * * * *